A. FRISCH.
CAPSTAN LATHE.
APPLICATION FILED MAY 4, 1916.
1,228,657.
Patented June 5, 1917.
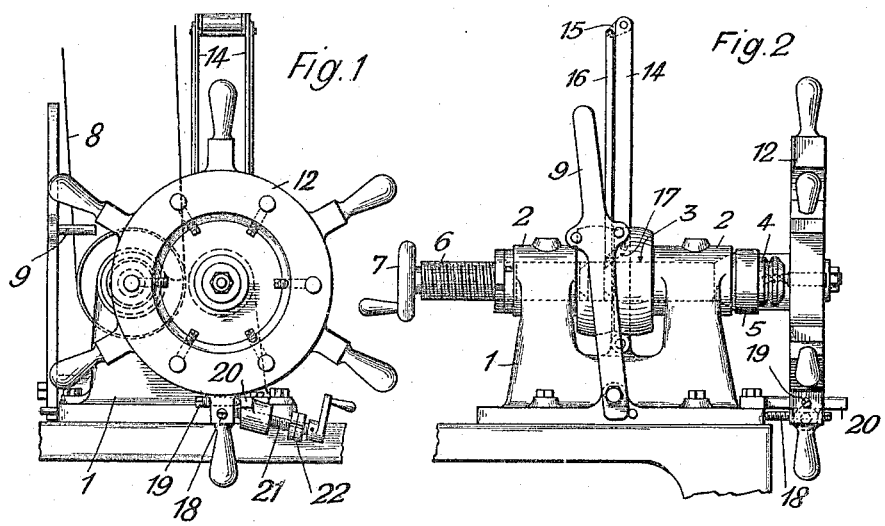
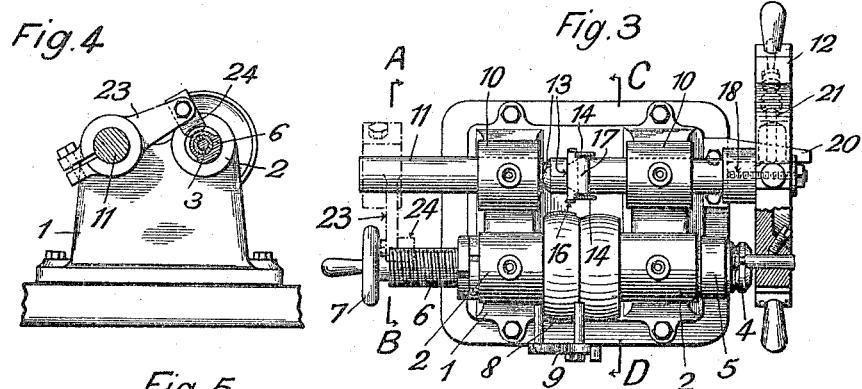
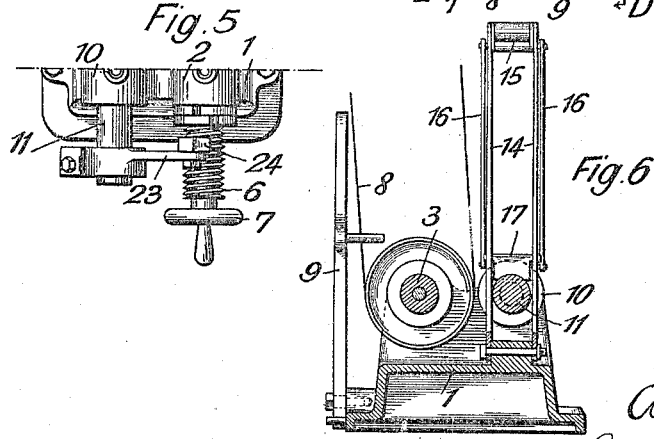
Inventor:
August Frisch,
By
Atty.

UNITED STATES PATENT OFFICE.

AUGUST FRISCH, OF ZÜRICH, SWITZERLAND, ASSIGNOR TO THE FIRM OF A. FRISCH & CO., OF ZÜRICH, SWITZERLAND.

CAPSTAN-LATHE.

1,228,657.   Specification of Letters Patent.   Patented June 5, 1917.

Application filed May 4, 1916. Serial No. 95,370.

*To all whom it may concern:*

Be it known that I, AUGUST FRISCH, a citizen of the Republic of Switzerland, residing at Zürich, Switzerland, have invented new and useful Improvements in Capstan-Lathes; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

In capstan lathes as heretofore constructed the mandrel carrying the revolving head is arranged either in line with the mandrel carrying the work, or parallel to the latter mandrel in front thereof. This arrangement results in a capstan lathe of large dimensions and consequently necessitates the use of a considerable amount of material in its construction and renders it expensive. Furthermore in capstan lathes already known a slide arrangement is provided for the displacement of the mandrel carrying the revolving head and such arrangement renders the lathe more complicated and consequently more costly than desirable.

The present invention has for its objects to obviate these disadvantages and to provide a capstan lathe the dimensions of which are as small as possible and which is of extremely simple construction.

According to the invention the mandrel carrying the revolving head is mounted in a headstock parallel to the work carrying mandrel and adjacent thereto and is rotatable and movable in a longitudinal direction. The revolving head mandrel may be provided at or near its rear end with an arm which carries a sectional nut adapted to engage a hollow lead screw mounted on the work-carrying mandrel. Furthermore, for limiting the rotary movement of the revolving head, a stop piece is provided, fitted with a stop adjustable in the direction in which the revolving head rotates in order to insure an exact feed of the revolving head to any extent desired.

The accompanying illustrative drawing shows a constructional example of capstan lathe according to the invention.

Figure 1 shows the lathe in front elevation,

Fig. 2 a side elevation thereof,

Fig. 3 a plan.

Fig. 4 is a section corresponding to the line A—B of Fig. 3, some parts being omitted.

Fig. 5 shows a portion of the lathe in plan, the revolving head mandrel being in a different position.

Fig. 6 is a section corresponding to the line C—D of Fig. 3.

1 is a headstock having bearings 2 for the work-carrying mandrel 3 which, at its front end is provided with a head 5 adapted to hold a piece of work 4. Mounted upon the rear end of the mandrel 3 is a hollow lead screw 6 which can be firmly held on the mandrel 3, for example by manipulation of a hand wheel 7 which also serves to tighten up the head 3 in order to hold the piece of work.

The mandrel 3 is also fitted with fast and loose pulleys associated with a driving belt 8 which can be displaced on the pulleys as desired by means of a belt fork 9.

In the headstock 1 there is mounted in bearings 10 parallel to the work-carrying mandrel 3 and adjacent thereto, a mandrel 11 on the front end of which is a revolving head 12. The revolving head 12 is provided with handles and, according to the constructional example shown, can accommodate six tools. The mandrel 11 is movable in the bearings 10 and is formed with two annular grooves 13. Arranged on the headstock 1 on both sides of the mandrel 11 are two upwardly extending bars 14 that run parallel to each other and which are connected together at their upper ends by a member 15 forming a handle. By means of links 16 the member 15 is connected with a latch device 17 that is mounted in the bars 14. The latch device 17 can engage with one or the other of the annular grooves 13 and, by turning the member 15, the latch device 17 can be lifted out of the said grooves.

Fitted in the revolving head 12, in numbers corresponding to the number of the tools which can be clamped in the said head, are adjustment screws 18 and adjustment screws 19. The adjustment screws 18 run parallel to the mandrel and from time to time one or the other of them can come opposite to and in contact with the headstock 1 and thus limit a movement of the revolving head toward the headstock. The adjustment screws 19 extend transverse to the direction of the mandrel 11 and from time to time one or the other of them can limit the rotation of the revolving head 12 in one direction by coming opposite to and in contact with a stop bar 20 fixed on the headstock 1. A screw spindle 21 is adjustable in the stop bar 20 and forms a stop for the revolving head as hereinafter described. Mounted upon the screw spindle 21 are two stop nuts 22.

Let it be assumed that the piece of work 4 is for example to be machined internally centrically. In this case the adjustment screw 19 located in the lowest position serves as a stop against rotation of the revolving head. By moving the handle member 15 in a direction away from the revolving head, when the latch device 17 is in engagement with one of the annular grooves 13, then the mandrel 11 will be so displaced that the tool lying opposite the piece of work will be moved into the same until the lowest adjustment screw 18 strikes the headstock 1. If considerable longitudinal displacement of the mandrel 11 be necessary then the latch device 17 can be connected consecutively with both annular grooves 13.

If the tool in operation is to act on the periphery of the piece of work, then the screw spindle 21 will be so placed that this spindle, and not the bar 20, forms a stop for the revolving head 12. By adjustment of the screw spindle 21, the machining of the piece of work can be controlled thereby. In such cases, when the tool is acting on the work from below the same, in which instance the revolving head 12 is moved by means of the spindle 21, the nuts 22 may act as a stop for limiting said movement of the head 12 effected by the spindle 21.

If it be desired to cut a screw thread on the work then an arm 23 is firmly clamped on the mandrel 11, which arm carries a sectional nut 24 that engages with the hollow lead screw 6. Owing to this the mandrel 11 will be displaced correspondingly to the pitch of the thread of the screw 6 and in accordance therewith so that a thread of corresponding pitch will be cut upon the work. The hollow screw 6 and the sectional nut 24 can be exchanged for similar parts with other pitch of screw thread in order to cut another pitch of thread on the work.

Instead of the stop formed by the screw spindle 21 a stop, movable by means of an eccentric or cam, could be provided.

The improved capstan lathe according to the present invention is of the simplest construction and easiest manipulation and all possible operations for a capstan lathe can be executed with it. The improved capstan lathe is moreover of very small dimensions.

Having now particularly described and ascertained the nature of said invention and in what manner the same is to be performed, I declare that what I claim is:

1. In a capstan lathe, a headstock, a work-carrying mandrel mounted therein, a lead screw fitted over said work carrying mandrel, a revolving head, a mandrel carrying the latter mounted in the headstock parallel to the work-carrying mandrel and rotatable and movable in a longitudinal direction, and an arm fixed on the mandrel carrying the revolving head and provided with a sectional nut engaging said lead screw.

2. In a capstan lathe, a headstock, a work-carrying mandrel mounted therein, a revolving head, a mandrel carrying the latter mounted in the headstock parallel to the work-carrying mandrel and rotatable and movable in a longitudinal direction, a stop-piece mounted on the revolving head adapted to limit the turning movement of the latter and a stop for the revolving head adjustable in the direction of rotation of the latter.

3. In a capstan lathe, a headstock, a work-carrying mandrel mounted therein, a lead screw fitted over said mandrel, a revolving head, a mandrel carrying the latter and mounted in the headstock parallel to the work-carrying mandrel and rotatable and movable in longitudinal direction, an arm fixed on the mandrel carrying the revolving head and provided with a sectional nut engaging said lead screw, a stop-piece mounted in the revolving head adapted to limit the turning movement of the latter, and a stop for said revolving head, adjustable in the direction of rotation of the latter.

In testimony that I claim the foregoing as my invention I have signed my name in presence of two subscribing witnesses.

AUGUST FRISCH.

Witnesses:
CARL GUBLER,
ARNOLD LEHNER.